May 16, 1967         H. E. RILEY, JR         3,319,993
           CARGO LID ASSIST MECHANISM
              Filed Nov. 23, 1964
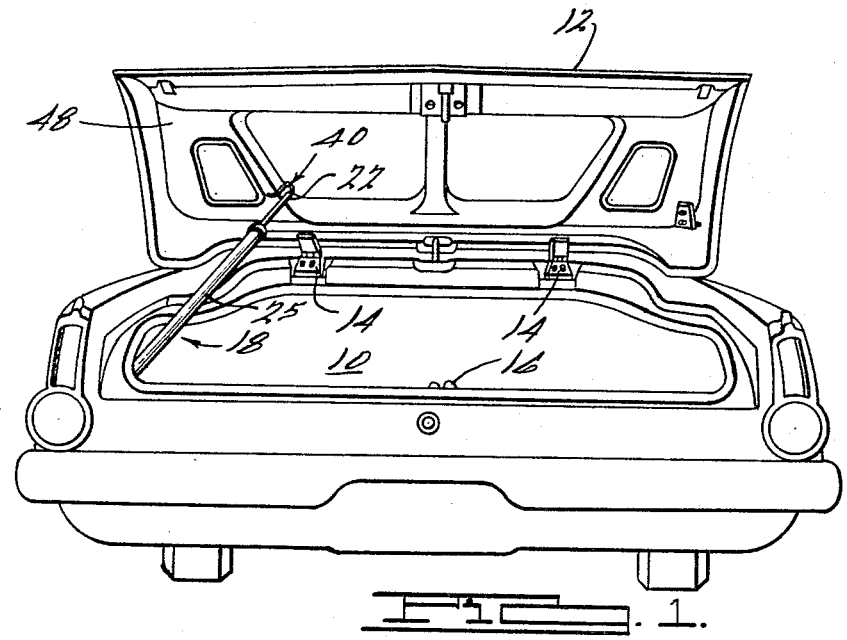
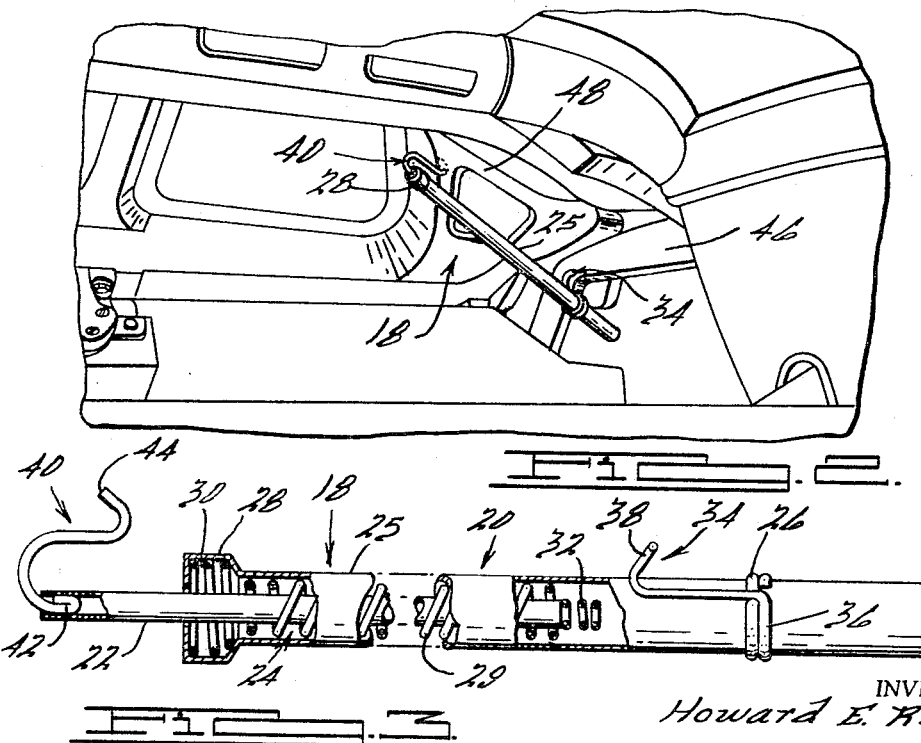
INVENTOR.
Howard E. Riley, Jr.
BY
Harness and Harris
ATTORNEYS.

United States Patent Office 3,319,993
Patented May 16, 1967

3,319,993
CARGO LID ASSIST MECHANISM
Howard E. Riley, Jr., Detroit, Mich., assignor to Chrysler Corporation, Highland Park, Mich., a corporation of Delaware
Filed Nov. 23, 1964, Ser. No. 412,955
8 Claims. (Cl. 296—76)

This invention relates to an assist mechanism for a cargo lid; more particularly, it relates to an assist mechanism for the deck or trunk lid of an automobile.

An object of the present invention is to provide an improved deck lid assist mechanism.

A more specific object is to provide a deck lid assist mechanism which will not obstruct, nor detract from the cargo capacity of, the cargo compartment.

Another object is to provide a deck lid assist mechanism that will be smooth in operation.

Yet another object is to provide a deck lid assist mechanism that will be inexpensive to product and repair, being comprised of only a relatively few inexpensive and simple parts.

Another object is to provide a deck lid assist mechanism that may be readily installed and that may be readily removed for replacement or repair.

These and other objects, features and advantages of the invention will be apparent from the following detailed description of a preferred embodiment of the invention and from the accompanying drawing wherein:

FIGURE 1 is a view looking into the open trunk or cargo compartment of an automobile and showing the assist mechanism of the invention in its extended or deck up position;

FIGURE 2 is a view looking from the passenger compartment of the automobile of FIGURE 1 into the closed trunk and showing the assist mechanism in its stowed or deck down position; and FIGURE 3 is a fragmentary view, on an enlarged scale, of the assist mechanism of the invention.

Referring first to FIGURE 1, the automobile shown therein includes a cargo compartment or trunk 10, a deck lid 12 pivotally mounted to the main body portion of the automobile by spaced hinges 14 and held in its down or closed position by a latch 16, and an assist mechanism shown generally at 18.

Referring now to FIGURE 3, mechanism 18 includes broadly, an outer tube 20, an inner tube or rod 22, and an elongated coil spring 24.

Tube 20 includes a main body portion 25, an upset annular portion 26, and a radially enlarged end portion 28.

Spring 24 is telescopically received within tube 20 and includes a main body portion 29 having convolutions of a diameter to fit snugly within the main body portion 25 of tube 20, an enlarged end portion 30 having convolutions of a diameter to fit snugly within the enlarged end portion 28 of tube 20, and a reduced end portion 32 having reduced diameter convolutions.

Rod or inner tube 22 is telescopically received within spring 24 and has a larger diameter than reduced end portion 32.

A set of hook elements, 34 and 40, are provided to mount the assist mechanism in the trunk of the automobile. Hook element 34 has a ring portion 36 and a hook portion 38. Hook element 34 is assembled to the assist mechanism by slipping ring portion 36 over tube 20 to seat it against upset annular portion 26 with the shank of the hook portion extending axially along tube 20 toward its enlarged end portion 28.

Hook element 40 is doubled over at one end to provide a mounting portion 42 and bent at its other end to provide a hook portion 44. Hook element 40 is assembled to the assist mechanism by slipping doubled over mounting portion 42 into the open free end of inner tube 22, so that the shank of hook portion 44 extends axially back along inner tube 22.

As best seen in FIGURE 2 the assembled assist mechanism is installed in the automobile trunk by passing the hook portion 38 of element 34 through a hole provided in a fixed portion of the automobile adjacent the cargo compartment and passing hook portion 44 of element 40 through a hole provided in lid 12. For example, and as shown, the hole receiving hook element 34 may be provided in the side reinforcement rail 46 of the quarter deck drain trough and the hole receiving hook element 40 may be provided in the inner reinforcing panel 48 of deck lid 12 at a location thereon spaced substantially rearwardly from the pivotal axis of hinges 14 and substantially inwardly from the side edge of lid 12.

It will be noted that this mounting arrangement, in which the two mounting points are substantially spaced along the pivotal axis of hinges 14, allows the assist mechanism to extend obliquely or askew of the pivotal axis of hinges 14. This oblique mounting allows the spring 24 to assume a longer length than would be the case were the assist mechanism mounted perpendicular to the hinge axis. The longer spring length thus available allows a lower spring rate to be selected which in turn allows the assist mechanism to be designed to produce a torque curve about the hinge axis more closely approximating the curve of the moment generated about that axis by the weight of lid 12.

The askew mounting of the assist mechanism also allows the percentage of the total available spring tension force actually applied to the lid in any angular position of the latter to be selectively varied, since selective movement of the lid mounting point relative to the body mounting point selectively varies the upward or usable component of the obliquely directed spring force vector.

The greater spring lengths and lower spring rates thus available, together with the large available range of upward spring force components, enables the assist mechanism of the invention to be selectively designed to match the size and weight of the deck lid as well as to produce the desired deck lid opening behavior.

As will be readily apparent, as the deck lid 12 is pivoted downwardly from the open position of FIGURE 1 toward the closed position of FIGURE 2, inner tube 22 is telescoped into outer tube 20 to press the captured end of tube 22 against the shoulder provided by the reduced end portion 32 of spring 24 and thus extend spring 24. In the closed position of FIGURE 2, inner tube 22 is completely telescoped into outer tube 20, so as to assume a minimum combined tube length, and tube 20 hugs the inner face of the trunk lid, so as not to detract from the cargo capacity of the trunk.

The concentric mounting of outer tube 20, spring 14, and inner tube 22, in addition to allowing inner tube 22 to telescope completely into outer tube 20, also allows the inner cylindrical surface of outer tube 20 to act as a telescopic bearing surface for spring 24 and allows the coils of spring 24 to provide at their inner surface a telescopic bearing surface for inner tube 22.

In moving from its extended position of FIGURE 1 to its stowed position of FIGURE 2, the upper end of the assist mechanism follows an arcuate path about the pivotal axis of hinges 14 so that the assist mechanism undergoes a compound rotational movement. This movement is made possible by the universal connections provided by the hook elements and coacting holes.

The dimensions and parameters of the various components of the assist mechanism of the invention are selected so that, even with lid 12 in the fully open or stop position of FIGURE 1, spring 24 is under tension. This assures that hook element 40 will be continually pressed into the free open end of inner tube 22 and that hook element 34 will be continually firmly seated against upset portion 26. The assist mechanism of the invention thus maintains itself in assembled relation by virtue of the continuous tension of spring 24 urging outer tube 20 and inner tube 22 to telescopically extend. It may be readily removed and disassembled for repair, replacement or adjustment by manually telescopically collapsing tubes 20 and 22 to free hook elements 34 and 40 from their respective holes, whereafter element 34 may be slipped off of tube 20, element 40 slipped out of tube 22, and inner tube 22 slipped out of tube 20. The assist mechanism may thus be removed from the automobile and disassembled in a few seconds and without the aid of tools. Reassembly and reinstallation is similarly simple and quick.

While a preferred embodiment of the invention has been illustrated and described in detail, it will be apparent that various changes may be made in the disclosed embodiment without departing from the scope or spirit of the invention as defined in the appended claims.

I claim:
1. In a motor vehicle having a cargo compartment and a lid for that compartment:
   A. a hinge at one edge of said lid mounting the latter on a fixed portion of said motor vehicle adjacent said compartment for pivotal movement between a closed position sealing said compartment and an open position allowing access thereto;
   B. first and second telescopically arranged elongated members;
      (1) pivotally secured at their respective free ends to a point on said fixed vehicle portion and to a point on said lid; and
      (2) extending between said points obliquely to the pivotal axis of said hinge;
   C. a coil spring arranged to be tensioned by and upon collapsing telescopic movement of said members.

2. A motor vehicle according to claim 1 wherein:
   A. said fixed vehicle portion is provided with an aperture adjacent the aforesaid point thereon;
   B. said lid is provided with an aperture adjacent the aforesaid point thereon; and
   C. said pivotally securing means comprises a hook element on the free end of each elongated member passing freely at its tip through the related aperture to provide a swivel connection at the free end of each of said elongated members.

3. In a motor vehicle having a cargo compartment and a lid member for that compartment:
   A. a hinge at one edge of said lid member mounting the latter for pivotal movement between a closed position sealing said compartment and an open position allowing access thereto;
   B. a fixed body member adjacent said cargo compartment;
   C. a tube pivotally connected at one end to one of said members;
   D. an elongated coil spring received telescopically within said tube and secured at one of its ends to said tube adjacent the free end of the latter; and
   E. a rod pivotally secured at one end to the other of said members and extending telescopically into said spring for engagement at its other end with the other end of said spring, whereby said spring is tensioned upon pivotal movement of said lid member toward its closed position and contracts to assist in the pivotal movement of said lid member toward its open position.

4. In a motor vehicle having a cargo compartment and a lid for that compartment:
   A. a hinge at one edge of said lid mounting the latter on a fixed portion on said motor vehicle adjacent said compartment for pivotal movement between a closed position sealing said compartment and an open position allowing access thereto;
   B. a tube pivotally connected to one end to said fixed body portion;
   C. an elongated coil spring received telescopically within said tube and secured at one of its ends to said tube adjacent the free end of the latter; and
   D. a rod pivotally secured at one end to said lid and extending telescopically into said spring for engagement at its other end with the other end of said spring, whereby said spring is tensioned upon pivotal movement of said lid toward its closed position and contracts to assist in the pivotal movement of said lid toward its open position.

5. A motor vehicle according to claim 3 wherein the coils of said spring adjacent its said other end are of smaller diameter than those constituting the main body portion of said spring to provide a shoulder against which the said other end of said rod bears.

6. In a motor vehicle having a cargo compartment and a lid member for that compartment:
   A. a hinge at one end of said lid mounting the latter for pivotal movement between a closed position sealing said compartment and an open position allowing access thereto;
   B. a fixed body member adjacent said compartment;
   C. a tube pivotally connected at one end to a point on one of said members;
   D. an elongated coil spring received telescopically within said tube and secured at one of its ends to said tube adjacent the free end of the latter; and
   E. a rod
      (1) pivotally connected at one end to a point on the other of said members spaced, measuring along the pivotal axis of said hinge, from said point on said one member and
      (2) extending telescopically into said spring for engagement at its other end with the other end of said spring, whereby said spring is tensioned upon pivotal movement of said lid member toward its closed position and contracts to assist in the pivotal movement of said lid member toward its open position.

7. In a motor vehicle having a cargo compartment and a lid for that compartment:
   A. a hinge at one end of said lid mounting the latter on a fixed portion of said motor vehicle adjacent said compartment for pivotal movement between a closed position sealing said compartment and an open position allowing access thereto;
   B. a tube pivotally connected at one end to a point on said fixed vehicle portion;
   C. an elongated coil spring received telescopically within said tube and secured at one of its ends to said tube adjacent the free end of the latter; and
   D. a rod
      (1) pivotally connected at one end to a point on said lid spaced, measuring along the pivotal axis of said hinge, from said fixed portion point and (2) extending telescopically into said spring for engagement at its other end with the other end of said spring, whereby said spring is tensioned upon pivotal movement of said lid toward its closed position and contracts to assist in the pivotal movement of said lid toward its open position.

8. A motor vehicle according to claim 7 wherein the aforesaid pivotal connection of said tube and rod is provided by a hook element on the said one end of each swivelly received in an aperture in said fixed body member and in said lid member, respectively.

References Cited by the Examiner
UNITED STATES PATENTS

| | | | |
|---|---|---|---|
| 2,129,338 | 9/1938 | Timmons | 16—72 |
| 2,253,161 | 8/1941 | Atwood. | |
| 2,650,386 | 9/1953 | Edwards | 16—72 |

BENJAMIN HERSH, *Primary Examiner.*

J. H. BRANNEN, *Assistant Examiner.*